(12) United States Patent
Yagi et al.

(10) Patent No.: US 8,603,196 B2
(45) Date of Patent: Dec. 10, 2013

(54) LITHIUM SECONDARY BATTERY MANUFACTURING METHOD COMPRISING FORMING LITHIUM METAL LAYER AND LITHIUM SECONDARY BATTERY

(75) Inventors: Hiromasa Yagi, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 13/057,260

(22) PCT Filed: Jul. 31, 2009

(86) PCT No.: PCT/JP2009/003662
§ 371 (c)(1),
(2), (4) Date: Feb. 2, 2011

(87) PCT Pub. No.: WO2010/016217
PCT Pub. Date: Feb. 11, 2010

(65) Prior Publication Data
US 2011/0136012 A1    Jun. 9, 2011

(30) Foreign Application Priority Data
Aug. 4, 2008   (JP) .................. 2008-200765

(51) Int. Cl.
| H01M 4/04 | (2006.01) |
| H01M 4/134 | (2010.01) |
| H01M 4/485 | (2010.01) |
| H01M 4/50 | (2010.01) |
| H01M 4/52 | (2010.01) |
| H01M 4/58 | (2010.01) |
| H01M 4/64 | (2006.01) |

(52) U.S. Cl.
USPC .............. 29/623.5; 429/218.1; 429/231.1; 429/231.3; 429/231.95; 429/233

(58) Field of Classification Search
USPC ........ 429/218.1, 231.95, 231.1, 231.8, 231.5, 429/144, 231.3, 233; 29/623.1, 623.5
See application file for complete search history.

(56) References Cited

U.S. PATENT DOCUMENTS

| 4,302,518 A | 11/1981 | Goodenough et al. |
| 4,357,215 A | 11/1982 | Goodenough et al. |

(Continued)

FOREIGN PATENT DOCUMENTS

| JP | 55-136131 | 10/1980 | |
| JP | 05144472 A | * 6/1993 | ............ H01M 10/40 |

(Continued)

OTHER PUBLICATIONS

Machine Translation of: JP 09/129241A, Inoue et al., May 16, 1997.*

(Continued)

*Primary Examiner* — Kenneth Douyette
(74) *Attorney, Agent, or Firm* — McDermott Will & Emery LLP

(57) ABSTRACT

A negative electrode active material layer 3 containing at least one element selected from the group consisting of silicon, germanium, and tin is formed on a negative electrode collector 1. A negative electrode 11 is prepared by forming a lithium metal layer on the negative electrode active material layer 3. Also prepared is a positive electrode 11 having a configuration in which a positive electrode active material layer 6 containing a composite oxide represented by a general formula $Li_{1-x}MO_2$, where $0.2 \le x \le 0.6$, and M includes at least one transition metal selected from the group consisting of cobalt, nickel, and manganese, is formed on a positive electrode current collector 5. A lithium secondary battery 100 is assembled from the negative electrode 13, the positive electrode 11, and a separator 4.

7 Claims, 11 Drawing Sheets

(56) References Cited

U.S. PATENT DOCUMENTS

| | | |
|---|---|---|
| 6,316,146 B1 * | 11/2001 | Watanabe et al. .......... 429/231.8 |
| 7,195,842 B1 | 3/2007 | Fujimoto et al. |
| 7,754,390 B2 | 7/2010 | Takezawa et al. |
| 7,794,878 B2 | 9/2010 | Kogetsu et al. |
| 2002/0012830 A1 | 1/2002 | Uemura et al. |
| 2002/0081485 A1 | 6/2002 | Takekawa et al. |
| 2005/0079421 A1 | 4/2005 | Konishiike et al. |
| 2007/0166613 A1 | 7/2007 | Kogetsu et al. |
| 2007/0190408 A1 * | 8/2007 | Inoue et al. .................... 429/145 |
| 2007/0218365 A1 | 9/2007 | Takezawa et al. |
| 2008/0020281 A1 * | 1/2008 | Kogetsu et al. ............ 429/231.5 |
| 2008/0070107 A1 * | 3/2008 | Kasamatsu et al. ............ 429/144 |
| 2008/0070120 A1 * | 3/2008 | Miyawaki et al. ....... 429/231.95 |
| 2008/0102359 A1 * | 5/2008 | Kogetsu et al. ............... 429/129 |
| 2008/0118842 A1 * | 5/2008 | Takezawa ................ 429/231.95 |

FOREIGN PATENT DOCUMENTS

| | | | |
|---|---|---|---|
| JP | 09/129241 A * | 5/1997 | ............. H01M 4/88 |
| JP | 2002-42893 | 2/2002 | |
| JP | 2002-203608 | 7/2002 | |
| JP | 2004-303597 | 10/2004 | |
| JP | 2005-190902 | 7/2005 | |
| JP | 2005-196970 | 7/2005 | |
| JP | 2006-260928 | 9/2006 | |
| JP | 2007-194076 | 8/2007 | |
| JP | 3991966 | 8/2007 | |
| JP | 2007-280926 | 10/2007 | |
| WO | WO 01/31720 A1 | 5/2001 | |

OTHER PUBLICATIONS

Machine Translation of: JP 05-144472 A, Nishikawa et al., Jun. 11, 1993.*

* cited by examiner

∴ $(m_1 + m_2) = (M_1 + m_3)$ and $M_1 = M_2$

∴ $(m_1 + m_2) = (M_1 + m_3)$ and $M_1 > M_2$

∴ $(m_1 + m_2) < (M_1 + m_3)$ and $M_1 > M_2$

LITHIUM SECONDARY BATTERY MANUFACTURING METHOD COMPRISING FORMING LITHIUM METAL LAYER AND LITHIUM SECONDARY BATTERY

RELATED APPLICATIONS

This application is the U.S. National Phase under 35 U.S.C. §371 of International Application No. PCT/JP2009/003662, filed on Jul. 31, 2009, which in turn claims the benefit of Japanese Application No. 2008-200765, filed on Aug. 4, 2008, the disclosures of which Applications are incorporated by reference herein.

TECHNICAL FIELD

The present invention relates to a lithium secondary battery manufacturing method and a lithium secondary battery.

BACKGROUND ART

In recent years, as portable apparatuses have been downsized and multifunctionalized, there is a strong demand for increasing the capacities of the batteries as power supplies for the portable apparatuses. Carbon, which is a negative electrode active material, mainly used in lithium secondary batteries today, has a theoretical capacity of 372 mAh/g. As an active material capable of increasing the battery capacity more than carbon, there has been developed a negative electrode using an element, such as silicon, germanium, and tin, that can be alloyed with lithium. Particularly, silicon having a theoretical capacity as large as 4200 mAh/g is regarded as promising.

When a material containing an element, such as silicon, that can be alloyed with lithium is used as a negative electrode active material, the negative electrode active material expands and contracts significantly by occluding and releasing lithium therein and therefrom through charge and discharge. In contrast, a charge collector hardly expands nor contracts. Thus, repeated charges and discharges separate the negative electrode active material from the charge collector, and the negative electrode active material fails to contribute to the charge and discharge. Moreover, when the negative electrode active material expands, the charge collector is elongated beyond an elastic deformation region. As a result, the negative electrode is deformed (buckled). The deformation of the negative electrode is not preferable, either, because it leads directly to a decreased capacity of the battery.

In order to solve this problem, JP 2005-196970 A, for example, discloses that a columnar body composed of a negative electrode active material is formed on a charge collector by oblique deposition. The oblique deposition is a vapor deposition technique in which the arrangement of a vapor deposition source, a vapor deposition face, and a mask is improved so that particles coming from the vapor deposition source are incident obliquely on the vapor deposition surface. The oblique deposition allows a gap to be created between adjacent columnar bodies, thereby suppressing to some extent the deformation of the negative electrode due to the expansion and contraction of the negative electrode active material. However, the oblique deposition does not always reduce the deformation of the negative electrode to a satisfying level.

JP 2006-260928 A discloses that a negative electrode is elongated mechanically before a battery is assembled, as a technique for suppressing the deformation of the negative electrode during charge. However, in order to elongate mechanically the electrode, it is necessary to apply a tensile load to a charge collector to reach, beyond an elastic deformation region, a plastic deformation area close to a breaking strength. That is, it is difficult to control the amount of elongation, and it is difficult to apply the technique to mass production.

On the other hand, with an intent to compensate the irreversible capacity and enhance the charging and discharging cycle properties, there is known a technique of allowing a negative electrode active material layer to occlude lithium in advance before assembling a battery (JP 2004-303597 A and JP 3991966 B, for example). JP 3991966 B describes in paragraph 0014 that allowing a negative electrode active material layer to occlude lithium in advance makes it possible to alleviate the stress applied on a negative electrode collector due to the expansion and contraction of the negative electrode active material layer through charge and discharge.

However, allowing the negative electrode active material layer to occlude lithium in advance results in that lithium is present in both of the positive electrode and the negative electrode when assembling the battery. This means that the amount of lithium that can be transferred between the positive electrode and the negative electrode decreases, more specifically, that the charge and discharge capacity decreases. The charge and discharge capacity may possibly decrease significantly depending on the amount of lithium to be occluded in the negative electrode in advance. Moreover, an excess amount of lithium may possibly be precipitated on a surface of the positive electrode or the negative electrode during charge and discharge.

CITATION LIST

Patent Literature

PTL 1: JP 2005-196970 A
PTL 2: JP 2006-260928 A
PTL 3: JP 2004-303597 A
PTL 4: JP 3991966 B

SUMMARY OF INVENTION

Technical Problem

The present invention has been accomplished in view of the foregoing circumstance, and it is an object of the present invention to provide a high capacity lithium secondary battery in which the deformation of a negative electrode can be suppressed. It is another object of the present invention to provide a method for manufacturing the lithium secondary battery.

Solution to Problem

More specifically, the present invention provides a method for manufacturing a lithium secondary battery, comprising the steps of:

forming, on a negative electrode current collector, a negative electrode active material layer containing at least one element selected from the group consisting of silicon, germanium, and tin;

preparing a negative electrode by forming a lithium metal layer on the negative electrode active material layer;

preparing a positive electrode having a configuration in which a positive electrode active material layer containing a composite oxide represented by a general formula $Li_{1-x}MO_2$, where $0.2 \le x \le 0.6$, and M includes at least one transition metal selected from the group consisting of cobalt, nickel, and manganese, is formed on a positive electrode current collector; and assembling a lithium secondary battery from the negative electrode, the positive electrode, and a separator.

In another aspect, the present invention provides a lithium secondary battery comprising:

a negative electrode having a negative electrode current collector and a negative electrode active material layer that is provided on the negative electrode current collector and contains at least one element selected from the group consisting of silicon, germanium, and tin;

a positive electrode having a positive electrode current collector and a positive electrode active material layer that is provided on the positive electrode current collector and contains a lithium composite oxide; and a separator disposed between the negative electrode and the positive electrode.

In a thickness direction of the separator, there are provided a first region in which the negative electrode active material layer faces the positive electrode active material layer, and a second region in which the negative electrode active material layer does not face the positive electrode active material layer.

A relationship below holds when an amount of lithium contained in the negative electrode per unit area in the second region is denoted as $M_1$, an amount of lithium for compensating an irreversible capacity of the negative electrode per unit area is denoted as $M_2$, an amount of lithium contained in the negative electrode per unit area in the first region is denoted as $m_1$, an amount of lithium contained in the positive electrode per unit area in the first region is denoted as $m_2$, and assuming that the lithium composite oxide has a stoichiometric composition, an amount of lithium to be contained in the positive electrode per unit area in the first region is denoted as $m_3$.

$$M_1 > M_2, \text{ and } (m_1 + m_2) < (M_1 + m_3)$$

Advantageous Effects of Invention

In the present invention, the lithium metal layer is formed on the negative electrode active material layer before the battery is assembled. Thereby, lithium is occluded in the negative electrode active material layer, making it possible to elongate the negative electrode current collector in advance. Therefore, it is possible to alleviate or suppress the deformation of the negative electrode during charge and discharge. Furthermore, a lithium-deficient lithium composite oxide is used as the positive electrode active material. That is, a space to occlude lithium is ensured in advance in the positive electrode. This makes it possible to avoid a decrease in the charge and discharge capacity due to the formation of the lithium metal layer on the negative electrode active material layer. In addition, it is possible to prevent an excess amount of lithium metal from being precipitated on the surface of the positive electrode or the negative electrode during charge and discharge. Therefore, the present invention can provide a high capacity lithium secondary battery in which the deformation of the negative electrode is reduced.

DESCRIPTION OF EMBODIMENTS

Figure 1:
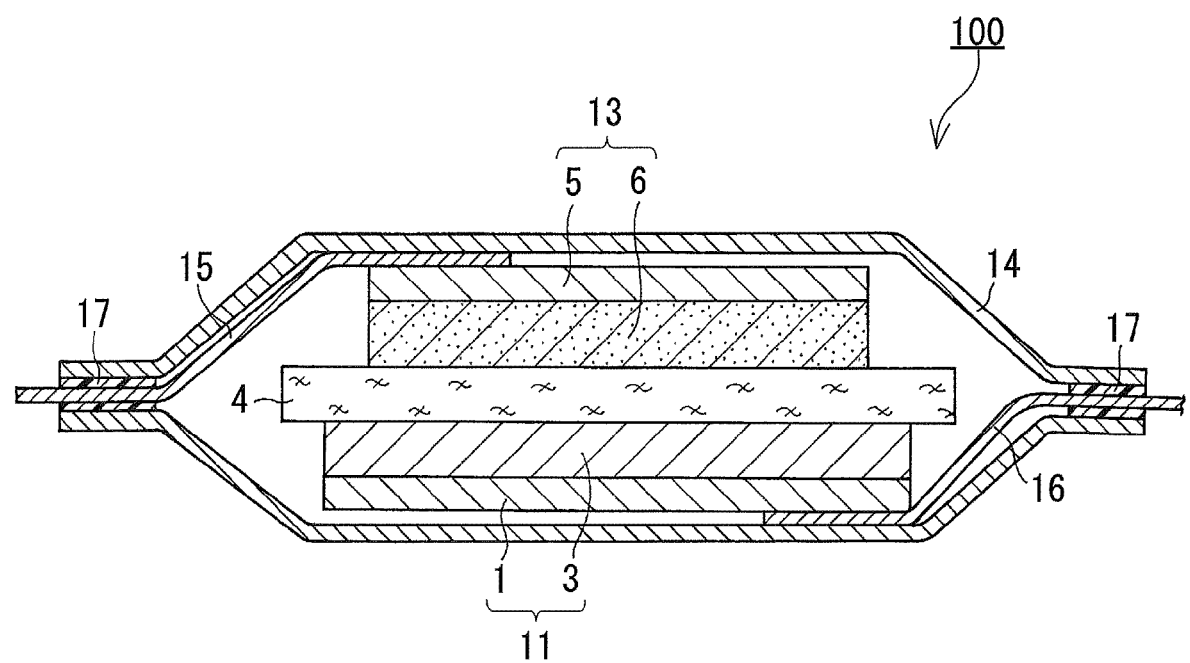
FIG. 1 is a schematic cross-sectional view of a lithium secondary battery according to one embodiment of the present invention.
Figure 2:
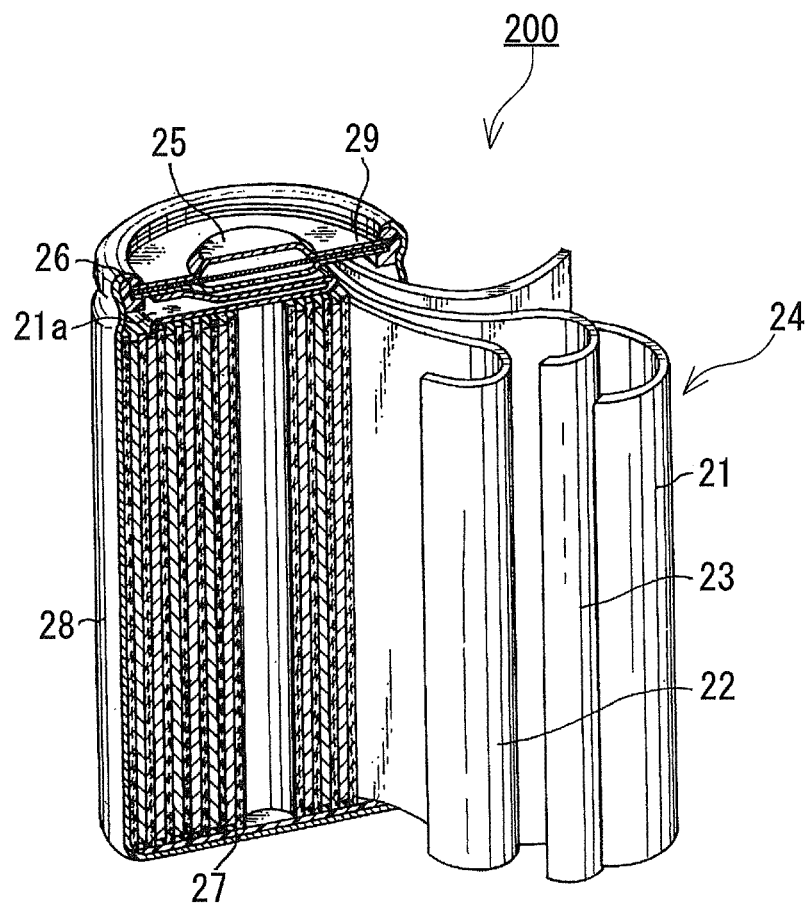
FIG. 2 is a schematic sectional perspective view of a lithium secondary battery according to another embodiment of the present invention.

FIG. 1 and FIG. 2 each show a typical structure of a lithium secondary battery that can be manufactured by the method of the present embodiment.

FIG. 1 shows a stack type lithium secondary battery. A lithium secondary battery 100 is provided with an electrode group including a positive electrode 13, a negative electrode 11, and a separator 4 disposed between these electrodes. The electrode group and an electrolyte having lithium ion conductivity are accommodated in an outer case 14. The positive electrode 13 is composed of a positive electrode current collector 5, and a positive electrode active material layer 6 that is in contact with the positive electrode current collector 5. The negative electrode 11 is composed of a negative electrode current collector 1, and a negative electrode active material layer 3 that is in contact with the negative electrode current collector 1. An end of a positive electrode lead 15 and an end of a negative electrode lead 16 are connected to the positive electrode current collector 5 and the negative electrode current collector 1, respectively. The other ends of the leads 15 and 16 extend outside the outer case 14. Opening portions of the outer case 14 are sealed with a resin material 17.

The positive electrode active material layer 6 releases lithium ions during discharge, and occludes, during discharge, lithium ions released from the negative electrode active material layer 3. The negative electrode active material layer 3 occludes, during charge, the lithium ions released from the positive electrode active material layer 6 and releases lithium ions during discharge.

FIG. 2 shows a wound-type lithium secondary battery. A lithium secondary battery 200 has a wound electrode group 24, and a battery case 28 accommodating the electrode group 24. The electrode group 24 is fabricated by winding a strip-like positive electrode 21 and a strip-like negative electrode 22 together with a wide separator 23 interposed between these electrodes. The electrode group 24 is impregnated with an electrolyte. An opening of the battery case 28 is closed with a sealing plate 29 having a positive electrode terminal 25. An end of a positive electrode lead 21*a* is connected to the positive electrode 21. The other end of the positive electrode lead 21*a* is connected to a back surface of the sealing plate 29. An insulating packing 26 is disposed around a periphery of the sealing plate 29. An end of a negative electrode lead (not shown) is connected to the negative electrode 22. The other end of the negative electrode lead is connected to the battery case 28. An upper insulating ring (not shown) and a lower insulating ring 27 are disposed at upper and lower sides of the electrode group 24, respectively.

The structure of the lithium secondary battery is not particularly limited in the present invention. Other structures, such as a coin-shape structure, suitably can be used besides those shown in FIGS. 1 and 2.

Next, the method for manufacturing the lithium secondary battery will be described.

(Fabrication of Negative Electrode)

First, a metal foil, such as a copper foil and a copper alloy foil, is prepared as the material for the negative electrode current collector 1. The metal foil has, for example, a width of 50 to 1000 mm and a thickness of 3 to 150 μm. Preferably, the metal foil is a roll-pressed foil having heat resistance. Subsequently, the metal foil is processed so that a plurality of projections having a specified shape in plane view are formed on a surface of the metal foil at a specified interval. Thus, the negative electrode current collector 1 is obtained. The shape of the projections is, for example, circular or polygonal in plane view. The processing for forming the projections may be machining such as press processing, or chemical processing such as etching.

Figure 3:
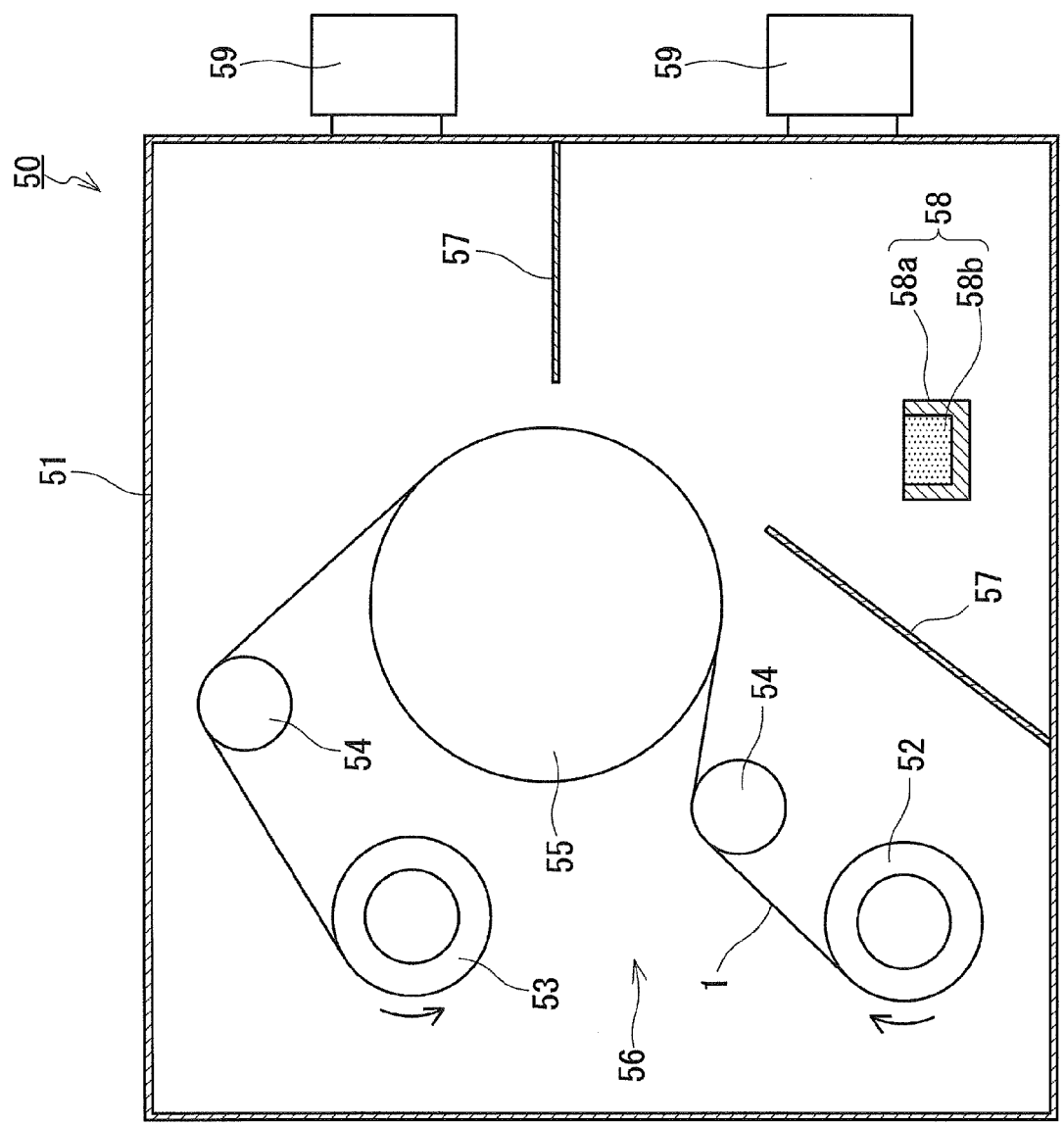
FIG. 3 is a schematic view of an vapor deposition apparatus for performing oblique deposition.

Next, the negative electrode active material layer 3 is formed on the negative electrode current collector 1. The method for forming the negative electrode active material layer 3 is not particularly limited. A vacuum vapor deposition method can be used, for example. FIG. 3 shows a schematic view of a vacuum vapor deposition apparatus. A vacuum vapor deposition apparatus 50 includes a vacuum chamber 51, a substrate transporting mechanism 56, a shielding plate 57, and an vapor deposition source 58. The substrate transfer mechanism 56, the shielding plate 57, and the vapor deposition source 58 are disposed in the vacuum chamber 51. A vacuum pump 59 is connected to the vacuum chamber 51. During vapor deposition, the vacuum pump 59 maintains the inside of the vacuum chamber 51 at a pressure suitable for forming the negative electrode active material layer 3 ($1.0 \times 10^{-2}$ to $1.0 \times 10^{-4}$ Pa, for example).

The substrate transfer mechanism 56 is composed of a feed roller 52, guide rollers 54, a take-up roller 53, and a can 55. The long negative electrode current collector 1 as a substrate is put on the feed roller 52. The guide rollers 54 are disposed on the upstream side and the downstream side, respectively, along the transfer direction of the negative electrode current collector 1. The guide roller 54 on the upstream side guides the negative electrode current collector 1 fed from the feed roller 52 to the can 55. The guide roller 54 on the downstream side guides the negative electrode current collector 1, which has been subject to vapor deposition, from the can 55 to the take-up roller 53.

The vapor deposition source 58 is configured so as to heat and evaporate a negative electrode active material 58*b* held in a crucible 58*a* with an electron beam or by electromagnetic induction. As the negative electrode active material 58*b*, at least one element selected from the group consisting of silicon, germanium, and tin can be used. The negative electrode active material layer 3 formed on the negative electrode current collector may contain an oxide of the above-mentioned element, a nitride of the above-mentioned element, an alloy of the above-mentioned element and another metal, etc.

The shielding plate 57 is disposed between the vapor deposition source 58 and the can 55. The vapor depositing area on the surface of the negative electrode current collector 1 is defined by an opening portion of the shielding plate 57. The particles (silicon particles, for example) coming from the vapor deposition source 58 are incident on the negative electrode current collector 1 mainly obliquely. More specifically, the negative electrode active material layer 3 can be formed on the negative electrode current collector 1 by an oblique deposition technique in which a material to be vapor-deposited is incident obliquely on the negative electrode current collector 1 having the projections. The oblique deposition makes it possible to form the negative electrode active material layer 3 with gaps created therein by a self-shadowing effect. The negative electrode active material layer 3 has a thickness of, for example, 1 to 50 μm.

Figure 4:
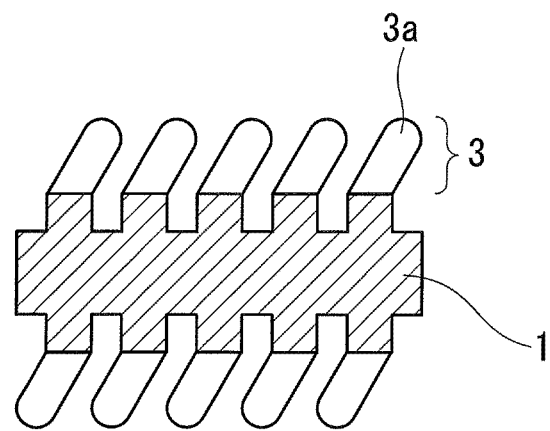
FIG. 4 is a schematic cross-sectional view of a negative electrode when a negative electrode active material layer has been formed on a negative electrode current collector.

FIG. 4 is a schematic cross-sectional view of the negative electrode when the negative electrode active material layer has been formed. The projections are formed orderly on the surface of the negative electrode current collector 1. With the synergistic effect of the projections and the oblique deposition, the negative electrode active material layer 3 composed of columns 3*a* is formed on the negative electrode current collector 1. The longitudinal direction of the columns 3*a* is oblique to the normal direction of the negative electrode current collector 1. Each of the columns 3*a* contains the negative electrode active material. A gap is created between adjacent columns 3*a*.

The method for forming the negative electrode active material layer 3 is not limited to vacuum deposition, and various thin film forming methods, such as a sputtering method and a CVD method, can be used. The negative electrode active material layer 3 may be formed also by an application method. A material having random projections and depressions, such as an electrolytic copper foil, also can be used as the negative electrode current collector 1. This is because the negative electrode active material layer with gaps created therein can be formed regardless of whether the projections and depressions are provided in an orderly manner. It is known that use of the material having random projections and depressions makes it possible to form a negative electrode active material layer divided into columns by cut (as shown in WO 2001/031720 A, for example).

Next, a lithium metal layer is formed on the negative electrode active material layer 3. Thereby, the negative electrode 11 is obtained. The lithium metal layer can be formed by vacuum vapor deposition of lithium metal on the negative electrode active material layer 3.

It is desired that the vapor deposition of lithium on the negative electrode active material layer 3 is performed while heating the negative electrode active material layer 3. For example, when a copper foil or a copper alloy foil is used as the material for the negative electrode current collector 1, lithium is vapor-deposited on the negative electrode active material layer 3 while keeping the negative electrode current collector 1 and the negative electrode active material layer 3 at a temperature of at least 200° C. but lower than 400° C. This allows lithium to diffuse quickly into the negative electrode active material layer 3. The strength of the negative electrode current collector 1 is not reduced unless the temperature is raised excessively. By keeping the strength of the negative electrode current collector 1 high, it is possible to suppress the deformation of the negative electrode 11 caused by the stress applied thereon during charge and discharge.

Figure 5:
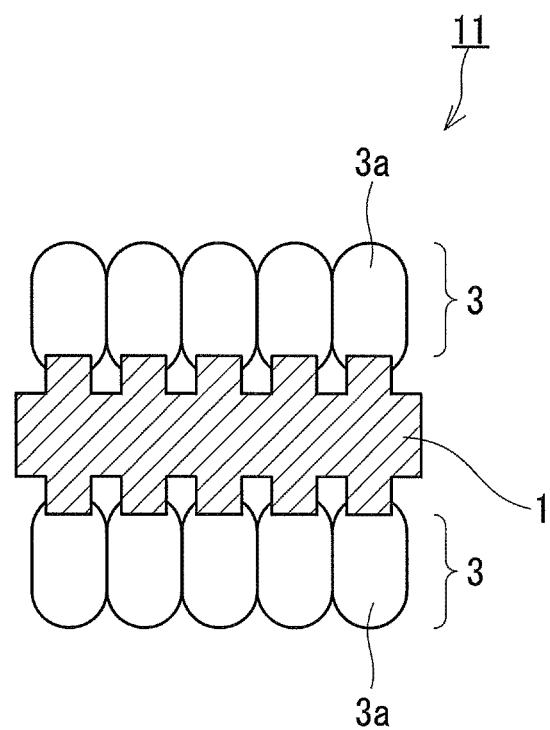
FIG. 5 is a schematic cross-sectional view of the negative electrode when lithium has been vapor-deposited on the negative electrode active material layer.

FIG. 5 is a schematic cross-sectional view of the negative electrode when the lithium metal layer has been formed on the negative electrode active material layer. The vapor-deposited lithium is occluded in the negative electrode active material layer 3. Each of the columns 3a composing the negative electrode active material layer 3 expands and slightly elongates, and the gap between adjacent columns 3a is lost. When the gap is lost, the stress generated when the adjacent columns 3a contact with each other causes the negative electrode 11 to elongate in an in-plane direction of the negative electrode current collector 1. Moreover, the stress is released in the thickness direction of the negative electrode active material layer 3, and thereby the columns 3a are elongated in the normal direction of the negative electrode current collector 1, and also the obliqueness of the columns 3a is reduced. When the battery is fully charged, the columns 3a are, for example, at least twice as high as the columns 3a before lithium was occluded therein, and the shape of the oblique columns 3a changes to be approximately vertical. The elongation of the negative electrode 11 when lithium has been vapor-deposited relates closely to the vapor deposition amount of lithium. In other words, it is possible to control the elongation of the negative electrode 11 by the vapor deposition amount of lithium.

The "in-plane direction of the negative electrode current collector 1" means an in-plane direction when assuming that no projections are present on the surface of the negative electrode current collector 1.

The method for forming the lithium metal layer is not limited to vacuum deposition, and various thin film forming methods, such as a sputtering method and a CVD method, can be used. It also is possible to allow the negative electrode active material layer 3 to occlude lithium by adhering a lithium foil to the negative electrode active material layer 3 and then heat-treating it.

(Fabrication of Positive Electrode)

As the material for the positive electrode current collector 5, a metal foil, such as an aluminum foil and an aluminum alloy foil, is prepared. The positive electrode current collector 5 has a width and a thickness almost the same as those of the negative electrode current collector 1. A positive electrode material mixture is applied in a thickness of 10 to 100 μm on the positive electrode current collector 5, by a known method such as a doctor blade method, to form the positive electrode active material layer 6. The positive electrode material mixture can be obtained by mixing a positive electrode active material, a conductive material, a binding material, and a solvent together. As the conductive material, conductive carbon, such as acetylene black, can be used. As the binding material, a fluororesin, such as polyvinylidene fluoride (PVdF), hexafluoropropylene (HFP), and polytetrafluoroethylene (PTFE), can be used. As the solvent, an organic solvent, such as N-methyl-2-pyrrolidone (NMP), can be used.

As the positive electrode active material, a lithium-deficient composite oxide can be used. The "lithium-deficient composite oxide" is a substance represented by a general formula $Li_{1-x}MO_2$, where $0.2 \leq x \leq 0.6$, and M includes at least one transition metal selected from the group consisting of cobalt, nickel, and manganese. Even when the positive electrode 13 is fabricated using the lithium-deficient composite oxide, the positive electrode active material can be changed into a stoichiometric composition ($LiMO_2$) by performing charge and discharge after the battery is assembled. This is because in the present embodiment, lithium is occluded in the negative electrode active material layer 3 in advance before the battery is assembled.

The lithium-deficient composite oxide can be produced by sintering a mixture of a lithium compound (lithium carbonate, for example) and a transition metal compound (a cobalt oxide, for example). Specifically, it is possible to adjust the ratio between the transition metal and lithium ("x" in the above-mentioned general formula) by adjusting the mixing ratio of the lithium compound and the transition metal compound. Moreover, it is possible to form the positive electrode active material layer containing the lithium-deficient composite oxide by fabricating the positive electrode using the composite oxide with a stoichiometric composition and reducing intentionally the amount of lithium in this positive electrode before the battery is assembled. The amount of lithium in the positive electrode can be reduced by charging a half cell including this positive electrode.

Typically, "M" in the composite oxide represented by the general formula $Li_{1-x}MO_2$ is a transition metal such as cobalt. However, the transition metal partly can be substituted with a small amount of another additive metal such as aluminum and zirconium.

(Assembly of Battery)

The negative electrode lead 16 is welded to the negative electrode 11, and the positive electrode lead 15 is welded to the positive electrode 13. The positive electrode lead 15 is made of, for example, aluminum or an aluminum alloy. The negative electrode lead 16 is made of, for example, copper, a copper alloy, nickel, or a nickel alloy. The negative electrode 11 and the positive electrode 13 are disposed on the right side and left side of the separator 4, respectively. Typically, the separator 4 is a microporous membrane made of polyethylene or polypropylene.

The electrode group composed of the negative electrode 11, the separator 4, and the positive electrode 13 is accommodated in the outer case 14. The electrode group is impregnated with an electrolyte having lithium ion conductivity. An electrolyte that typically can be used as the electrolyte having lithium ion conductivity is a nonaqueous electrolyte obtained by dissolving a lithium salt such as $LiPF_6$ in an organic solvent such as ethylene carbonate and propylene carbonate. The composition of the nonaqueous electrolyte is not particularly limited. A solid electrolyte may be used instead of the electrolyte. The outer case 14 can be composed of a flexible sheet obtained by forming a resin layer on both surfaces of a metal foil such as an aluminum foil. The opening portions of the outer case 14 are sealed with the resin material 17, and thereby the lithium secondary battery 100 (see FIG. 1) can be obtained.

(Action of Lithium Ion Secondary Battery)

Figure 6:
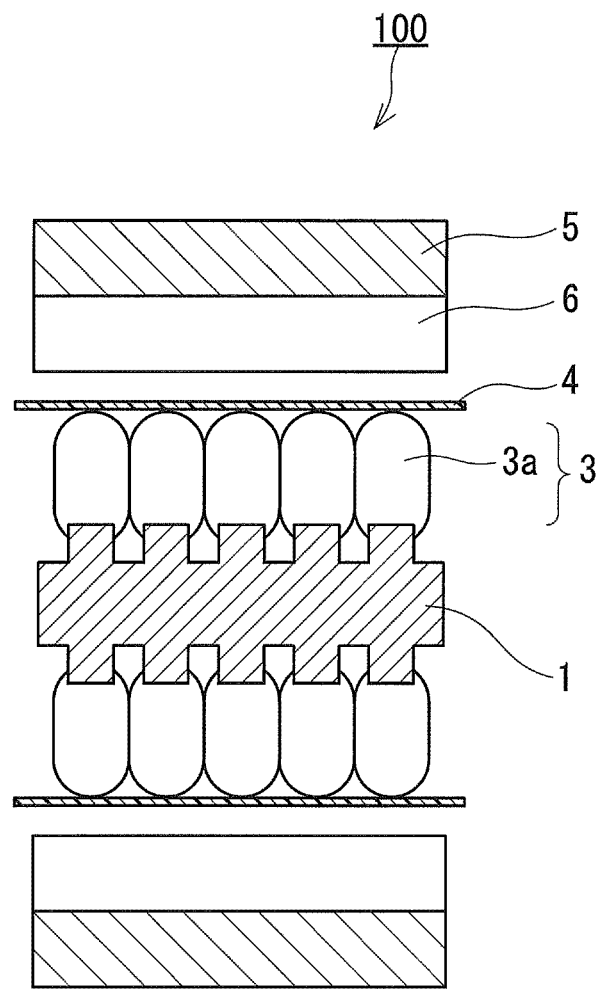
FIG. 6 is a schematic cross-sectional view of the lithium secondary battery in a charge state.
Figure 7:
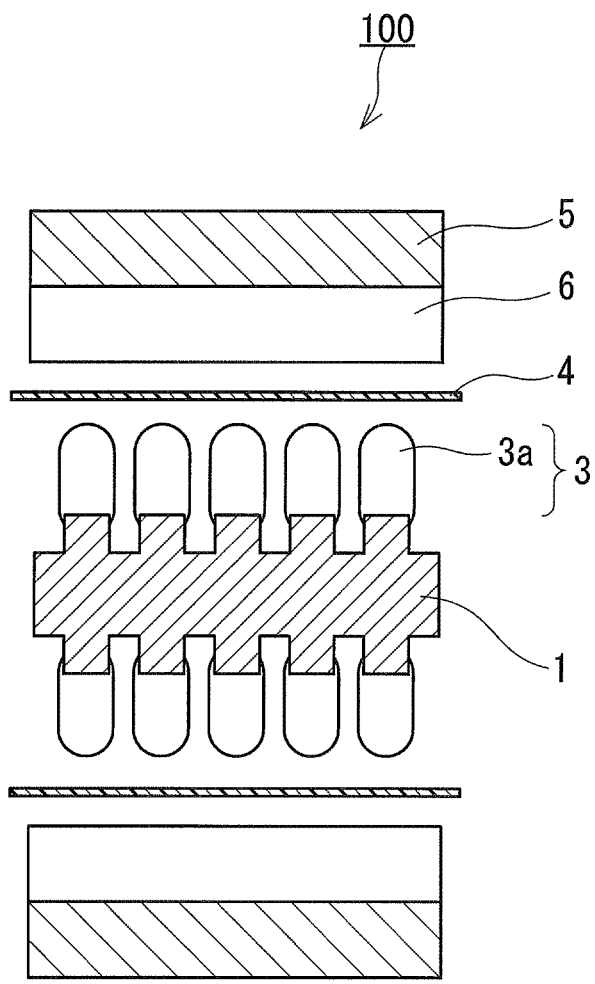
FIG. 7 is a schematic cross-sectional view of the lithium secondary battery in a discharge state.

As shown in FIG. 6, when the lithium secondary battery 100 manufactured by the method of the present embodiment is charged, a stress is generated by the expansion of the negative electrode active material layer 3 and the negative electrode current collector 1 is elongated in the in-plane direction. As shown in FIG. 7, when the battery is discharged, the negative electrode active material layer 3 contracts and a gap is created between adjacent columns 3a. In the discharge state, the stress is released at the negative electrode current collector 1, minimizing the elongation of the negative electrode current collector 1. Moreover, in the discharge state, the obliqueness of the columns 3a is smaller than that before the battery is charged.

Figure 8A:
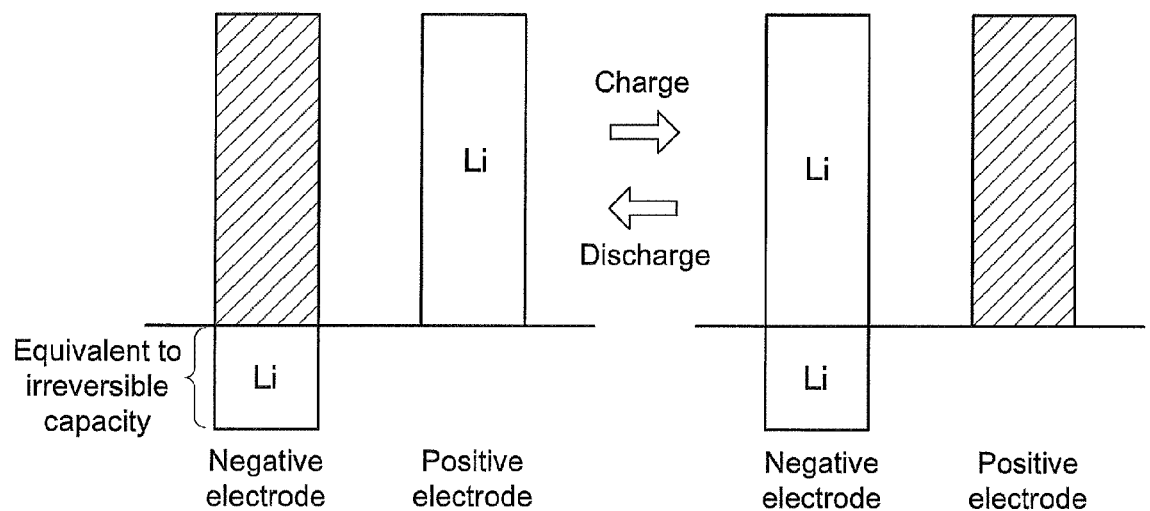
FIG. 8A shows a schematic diagram illustrating the charge state and the discharge state of a lithium secondary battery compensated with an amount of lithium equivalent to an irreversible capacity.

FIG. 8A shows a schematic diagram illustrating the charge state and the discharge state of a conventional lithium secondary battery (Comparative Example 1 to be described later) compensated with an amount of lithium equivalent to an irreversible capacity. The hatched parts each indicate the substantial capacity of the battery. Strictly speaking, the positive electrode also has an irreversible capacity. However, as shown in FIG. 8A, when the negative electrode has a large irreversible capacity (when the negative electrode active material is, for example, silicon, germanium, tin, or an oxide thereof), the irreversible capacity of the positive electrode is far smaller, and thus the irreversible capacity of the positive electrode is ignored. The charge and discharge capacity is increased by allowing the negative electrode to occlude, in advance, an amount of lithium equivalent to the irreversible capacity. However, the elongation of the negative electrode is not always large. When a battery is assembled from the negative electrode and the positive electrode that are in the state shown in the left diagram of FIG. 8A and is charged, the negative electrode occludes lithium. Thereby, the columns (see FIGS. 4 to 7) composing the negative electrode active material layer expand significantly and the negative electrode is elongated. The negative electrode contracts when the battery is discharged. When the dimensions of the negative electrode at the time of assembling the battery are taken as a reference, the degree of expansion and contraction of the negative electrode during charge and discharge is high. Thus, the effect of suppressing the deformation of the negative electrode during charge and discharge is insufficient.

Figure 8B:
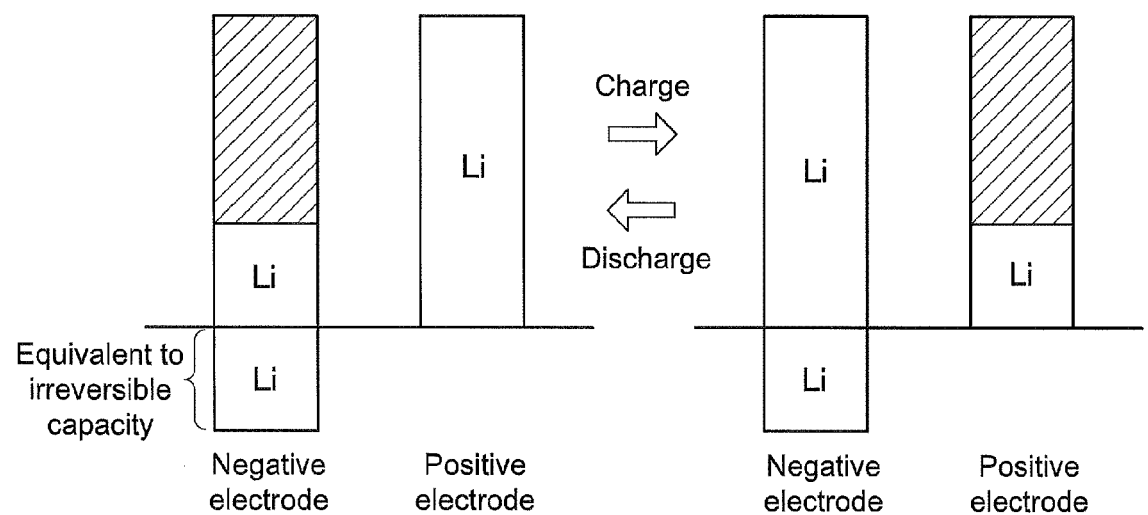
FIG. 8B shows a schematic diagram illustrating the charge state and the discharge state of a lithium secondary battery fabricated from a negative electrode compensated with an amount of lithium exceeding an amount equivalent to an irreversible capacity and a positive electrode composed of a composite oxide with a stoichiometric composition.

FIG. 8B shows a schematic diagram illustrating the charge state and the discharge state of a lithium secondary battery (Comparative Example 4 to be described later) fabricated from a negative electrode compensated with an amount of lithium exceeding an amount equivalent to the irreversible capacity and a positive electrode composed of a composite oxide with a stoichiometric composition. By compensating the negative electrode with an excess amount of lithium, it is possible to allow the elongation of the negative electrode before assembly to be relatively large. When the battery is assembled with the negative electrode being elongated to some extent and is charged, the negative electrode surely is elongated, but this elongation is not so large as that in the conventional lithium secondary battery shown in FIG. 8A. However, since the positive electrode is made of the active material with a stoichiometric composition, the amount of lithium that can be transferred between the negative electrode and the positive electrodes is limited, that is, the charge and discharge capacity is small. Moreover, there is a concern that lithium dendrite may be precipitated due to an excess amount of lithium present in the battery.

Figure 8C:
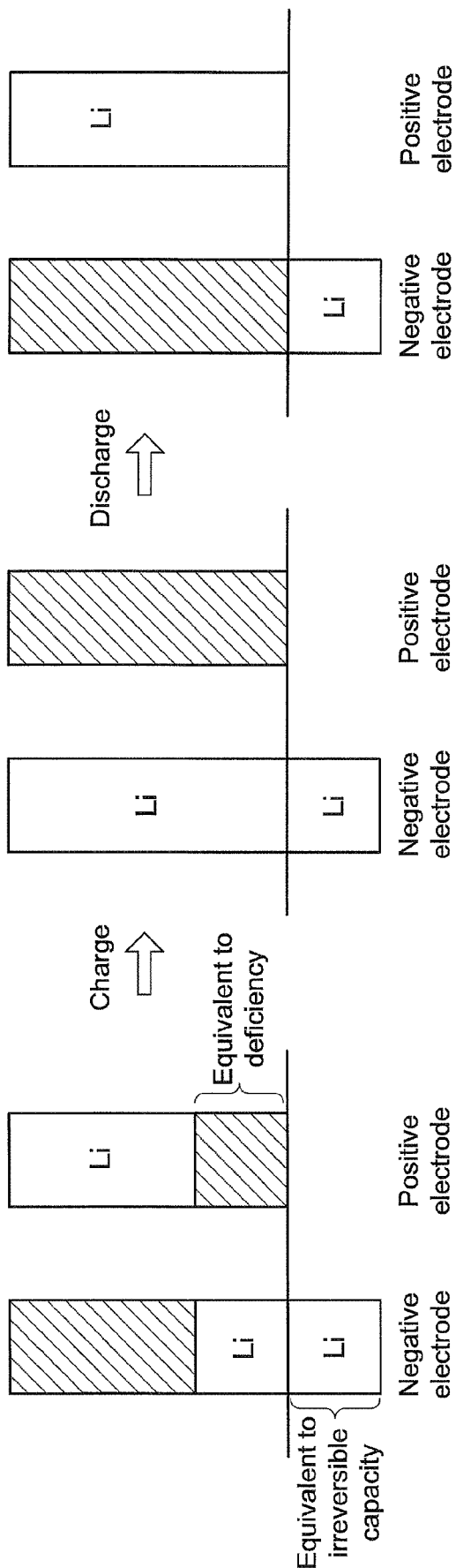
FIG. 8C shows a schematic diagram illustrating the charge state and the discharge state of a lithium secondary battery manufactured by the method of the present invention.

In contrast, as shown in FIG. 8C, the lithium secondary battery manufactured by the method of the present invention can be in the same state as that of the lithium secondary battery shown in FIG. 8A by being charged and discharged because, although the negative electrode contains an excess amount of lithium before assembly, lithium in the positive electrode is reduced in advance. Therefore, high capacity can be achieved easily. Moreover, by compensating the negative electrode with an amount of lithium exceeding an amount equivalent to the irreversible capacity, it is possible to allow the elongation of the negative electrode before assembly to be larger than that in FIG. 8A. When the battery is assembled with the negative electrode being elongated to some extent and is charged, the negative electrode is elongated, but the elongation is not so large as that of the conventional lithium secondary battery shown in FIG. 8A. Although the negative electrode contracts when the battery is discharged, the negative electrode can have negative dimensions when the dimensions of the negative electrode at the time of assembling the battery are taken as a reference. That is, the degree of expansion and contraction of the negative electrode during charge and discharge falls within a certain range when the dimensions of the negative electrode at the time of assembling the battery are taken as a reference. As a result, the effect of suppressing the deformation of the negative electrode during charge and discharge is obtained. In this way, the present invention makes it possible to overcome the problems of the lithium secondary batteries shown in FIGS. 8A and 8B.

The amount of lithium with which the negative electrode is to be compensated can be determined by the following method. Specifically, a charge capacity and a discharge capacity of the negative electrode active material layer on which the lithium metal layer is to be formed are measured, and the irreversible capacity of the negative electrode active material layer is calculated in advance based on a capacity obtained by subtracting the measured discharge capacity from the measured charge capacity. More specifically, a half cell is fabricated using: a laminate of the negative electrode active material layer and the negative electrode current collector before lithium is vapor-deposited (hereinafter, the laminate is referred to as a "base negative electrode" in this description); and a counter electrode (a lithium metal counter electrode, for example). The value obtained by subtracting a discharge capacity of the half cell from a charge capacity of the half cell is the irreversible capacity.

In the step of forming the lithium metal layer, the lithium metal layer is formed on the negative electrode active material layer so that the lithium metal layer contains an amount of lithium exceeding an amount of lithium capable of compensating the irreversible capacity calculated in advance. By compensating the negative electrode with an amount of lithium exceeding the irreversible capacity, it is possible to allow the elongation of the negative electrode before assembly to be increased as described above.

It is desirable that, as described above, the degree of expansion and contraction of the negative electrode during charge and discharge falls within a certain range when the dimensions of the negative electrode at the time of assembling the battery are taken as a reference. Specifically, first, a length of the negative electrode current collector in a specified direction in a plane before the lithium metal layer is formed is denoted as $S_0$, a length of the negative electrode current collector in the specified direction when the lithium metal layer has been formed is denoted as $S_1$, a length of the negative electrode current collector in the specified direction when the assembled lithium secondary battery is in a charge state is denoted as $S_C$, and a length of the negative electrode current collector in the specified direction when the assembled lithium secondary battery is in a discharge state is denoted as $S_D$. Furthermore, an initial elongation percentage, an elongation percentage in the charge state, and an elongation percentage in the discharge state are defined by formulae (1) to (3) below, respectively. As the specified direction in the plane, the longitudinal direction or the lateral direction of the negative electrode current collector can be considered.

$$\text{(Initial elongation percentage)} = 100 \times (S_1 - S_0)/S_0 \quad (1)$$

$$\text{(Elongation percentage in the charge state)} = 100 \times (S_C - S_0)/S_0 \quad (2)$$

$$\text{(Elongation percentage in the discharge state)} = 100 \times (S_D - S_0)/S_0 \quad (3)$$

Then, the elongation percentages in the charge state and the discharge state are adjusted so as to suppress the deformation of the negative electrode during charge and discharge. For example, the amount of lithium in the lithium metal layer is adjusted so that a value obtained by subtracting the initial elongation percentage from the elongation percentage in the charge state is 1% or less and a value obtained by subtracting the initial elongation percentage from the elongation percentage in the discharge state is −1% or more. This makes it possible to obtain sufficiently the effect of suppressing the deformation of the negative electrode and also to prevent lithium from being precipitated in the battery. The elongation percentage in the longitudinal direction and the elongation percentage in the lateral direction may be calculated separately, so that the average value thereof is used as each of these elongation percentages. The value obtained by subtracting the initial elongation percentage from the elongation percentage in the charge state is more than 0%. The value obtained by subtracting the initial elongation percentage from the elongation percentage in the discharge state is less than 0%.

(Method for Specifying the Amount of Lithium)

Having been charged and discharged repeatedly, the lithium secondary battery manufactured by the method of the present invention seems to be indistinguishable from a conventional lithium secondary battery (FIG. 8A). However, the following method makes it possible to distinguish the lithium secondary battery manufactured by the method of the present invention from the conventional lithium secondary battery.

Figure 9:
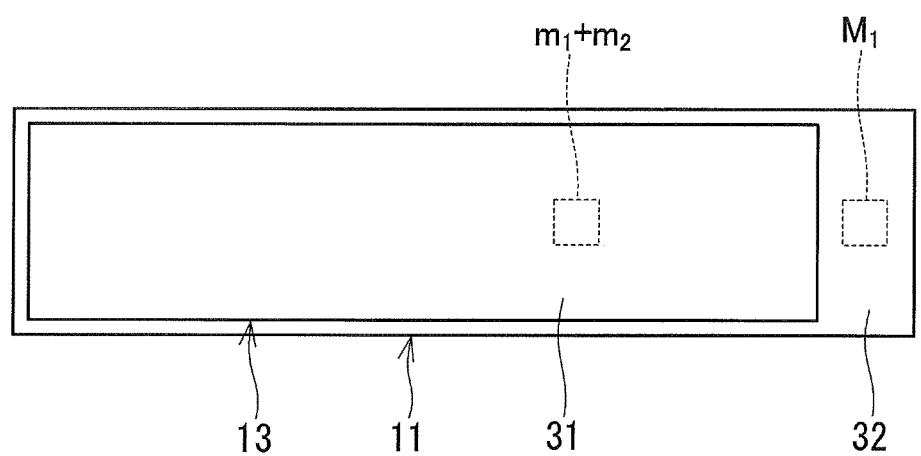
FIG. 9 is a schematic view showing a method for specifying the amount of lithium contained in the lithium secondary battery manufactured by the method of the present invention.

As shown in FIG. 1 and FIG. 9, the lithium secondary battery 100 has, in a thickness direction of the separator 4, a first region 31 in which the negative electrode active material layer 3 faces (overlaps with) the positive electrode active material layer 6, and a second region 32 in which the negative electrode active material layer 3 does not face (protrudes from) the positive electrode active material layer 6. The following relationship holds in the lithium secondary battery manufactured by the method of the present invention. First, when an amount of lithium contained in the negative electrode 11 per unit area in the second region 32 is denoted as $M_1$, and an amount of lithium for compensating the irreversible capacity of the negative electrode 11 per unit area is denoted as $M_2$, a relationship of $M_1 > M_2$ holds. That is, the negative electrode 11 maintains, in the second region 32, the state shown in the left diagram of FIG. 8C. This is based on the fact that the negative electrode 11 in the second region 32 hardly contributes to the charge and discharge.

Furthermore, when an amount of lithium contained in the negative electrode 11 per unit area in the first region 31 is denoted as $m_1$, an amount of lithium contained in the positive electrode 13 per unit area in the first region 31 is denoted as $m_2$, and assuming that the lithium composite oxide contained in the positive electrode 13 has a stoichiometric composition, an amount of lithium to be contained in the positive electrode 13 per unit area in the first region 31 is denoted as $m_3$, a relationship of $(m_1 + m_2) < (M_1 + m_3)$ holds.

Figure 10A:
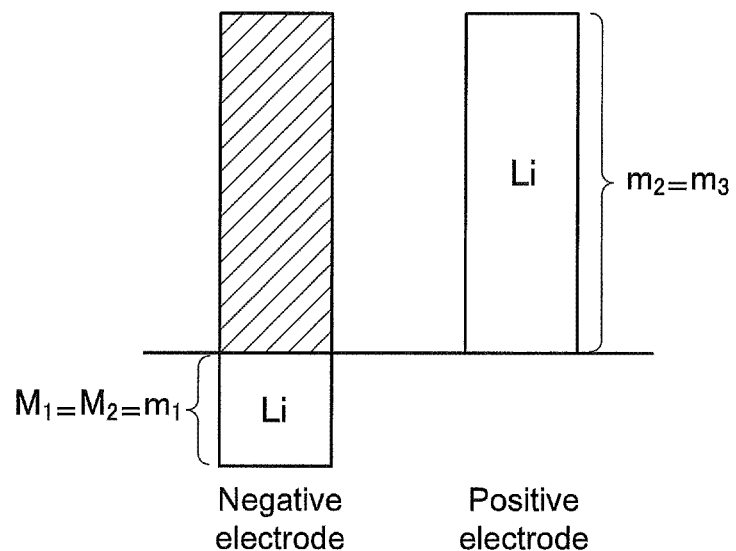
FIG. 10A is a schematic diagram illustrating a distribution of lithium contained in the lithium secondary battery compensated with an amount of lithium equivalent to the irreversible capacity.
Figure 10B:
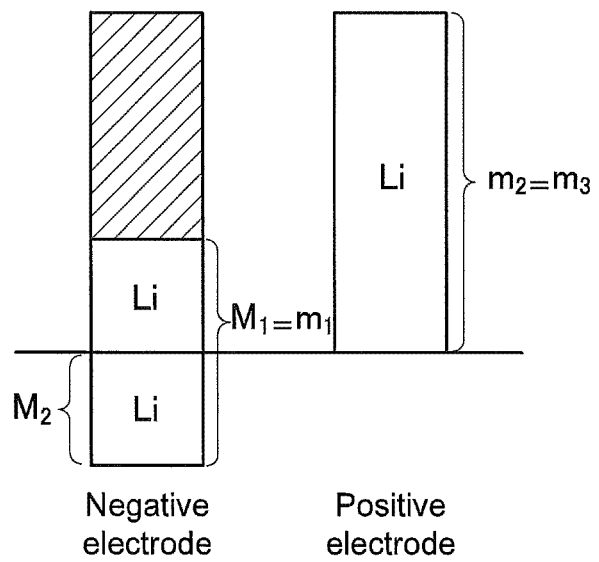
FIG. 10B is a schematic diagram illustrating a distribution of lithium contained in the lithium secondary battery fabricated from the negative electrode compensated with an amount of lithium exceeding an amount equivalent to the irreversible capacity and the positive electrode composed of a composite oxide with a stoichiometric composition.
Figure 10C:
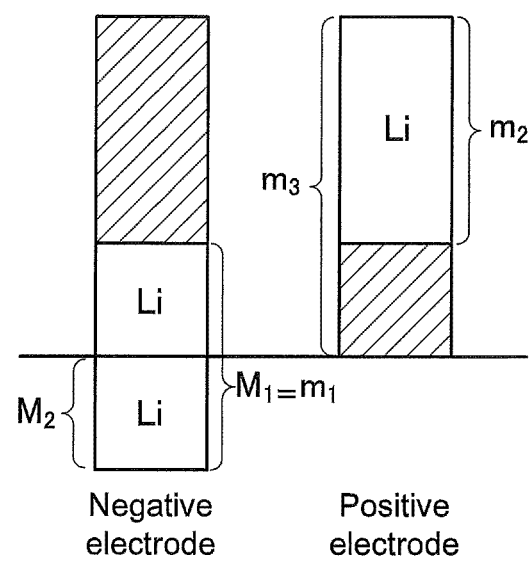
FIG. 10C is a schematic diagram illustrating a distribution of lithium contained in the lithium secondary battery manufactured by the method of the present invention.

The above-mentioned relationship can be derived easily from calculating the amounts of lithium contained in the negative electrode and the positive electrode before assembly. More specifically, as shown in FIG. 10C, the amount of lithium occluded in the negative electrode 11 conforms to each of the values $M_1$ and $m_1$, and the amount of lithium contained in the positive electrode 13 conforms to the value $m_2$, before assembly. The value $M_2$ conforms to the amount of lithium remaining in the negative electrode 11 after the battery is fully discharged. The value $m_3$ can be calculated from the amount (weight or molar quantity) of another metal contained in the positive electrode 13. These values satisfy the above-mentioned relationship. "To be fully discharged" means the state in which the voltage of the battery has reached the discharge final voltage (2V, for example).

Usually, in commercially-available lithium secondary batteries, no compensation with lithium is carried out, and thus $M_1$ is 0. As shown in FIG. 10A, in a conventional lithium secondary battery in which a compensation with an amount of lithium equivalent to the irreversible capacity is carried out, relationships of $M_1 = M_2$ and $(m_1 + m_2) = (M_1 + m_3)$ hold. As shown in FIG. 10B, in the lithium secondary battery fabricated from the negative electrode compensated with an amount of lithium exceeding an amount equivalent to the irreversible capacity and the positive electrode composed of a composite oxide with a stoichiometric composition, relationships of $M_1 > M_2$ and $(m_1 + m_2) = (M_1 + m_3)$ hold.

EXAMPLES

<Fabrication of Negative Electrode>

(a) Fabrication of Negative Electrode Current Collector

As the material for the negative electrode current collector, a copper alloy foil with a thickness of 26 μm was prepared. The copper alloy foil was subject to press processing on its front and back surfaces so that projections, each having a rhomboidal shape in plane view and diagonal lines of 10×20 μm, are formed thereon at an interval of 30 μm. The height of the projections was set to 6 μm. Subsequently, a copper roughening plating layer with a thickness of 2 μm was formed on each of the surfaces of the copper alloy foil by an electrolytic copper plating method. Thus, a negative electrode current collector was obtained. The copper roughening plating layer had Ra, an arithmetic mean roughness according to JIS B 0601 (1994), of about 0.5 μm.

(b) Formation of the Negative Electrode Active Material Layer

Next, a negative electrode active material layer containing silicon and a silicon oxide was formed on the negative electrode current collector by the oblique deposition described with reference to FIG. 3. The vapor deposition was performed in the same manner also on the back surface of the negative electrode current collector, thereby forming the negative electrode active material layer on both sides of the negative electrode current collector. The thickness (the height of the columns 3a shown in FIG. 4) of each of the negative electrode active material layers was 14 μm.

(c) Measurement of Irreversible Capacity of Base Negative Electrode

A half cell was fabricated from a laminate (a base negative electrode) of a negative electrode active material layer on which a lithium metal layer has not yet been formed and a negative electrode current collector, and a lithium metal counter electrode. The half cell was charged and discharged so as to measure the charge capacity, discharge capacity, and the irreversible capacity. Specifically, a part of the base negative electrode was cut out into dimensions of 15×15 mm, and a nickel lead was bonded to an end thereof by spot welding. As the lithium metal counter electrode, there was prepared a lithium metal counter electrode obtained by fixing a nickel lead to an end of a lithium metal plate having the same dimensions as those of the base negative electrode. The base negative electrode with separators (each of which is a polyethylene microporous membrane with a thickness of 16 μm) disposed on the surfaces of the base negative electrode, respectively, was sandwiched between two lithium metal counter electrodes. An electrode group composed of the base negative electrode, the separators, and the lithium metal counter electrodes was accommodated in an outer case, and 1 cm$^3$ of electrolyte was poured into the outer case. The outer case was sealed by heat sealing. Thus, the half cell was obtained. As the electrolyte, there was used an electrolyte obtained by dissolving, at a concentration of 1 mol/liter, LiPF$_6$ in a solvent containing ethylene carbonate (EC), ethyl methyl carbonate (EMC), and diethyl carbonate (DEC) at a volume ratio of 3:5:2. The electrolyte having the same composition also was used below.

Subsequently, the half cell was charged with a current of 1 mA/cm$^2$ until the voltage between the two electrodes becomes 0 V. Thereafter, the half cell was discharged with a current of 1 mA/cm$^2$ until the voltage between the electrodes becomes 2 V. In this way, the charge and discharge capacities were measured. The capacity obtained by subtracting the discharge capacity from the charge capacity at that time was used as the irreversible capacity of the negative electrode to be fabricated. Since the base negative electrodes each had a charge capacity of 6.5 mAh/cm$^2$ and a discharge capacity of 5.0 mAh/cm$^2$, the irreversible capacity was 1.5 mAh/cm$^2$.

(d) Determination of Vapor Deposition Amount of Lithium

According to the pilot study conducted by the present inventors, when lithium is vapor-deposited in a thickness of 1 μm on the negative electrode active material layer, an irreversible capacity of 0.2 mAh/cm$^2$ can be compensated. Since the irreversible capacity was 1.5 mAh/cm$^2$ in the present example, the irreversible capacity can be compensated completely when lithium is vapor-deposited in a thickness of 7.5 μm. When lithium is vapor-deposited in a thickness exceeding 7.5 μm, lithium can be supplied from the negative electrode to the positive electrode after the lithium secondary battery is assembled.

(e) Formation of the Lithium Metal Layer

Subsequently, the fabricated base negative electrode was cut out into dimensions of 15×15 mm, and lithium was vapor-deposited on both surfaces thereof. The positional relationship between the base negative electrode and the lithium vapor deposition source was determined so that the incident direction of lithium was perpendicular to the surface of the negative electrode current collector. Lithium was vapor-deposited while keeping the temperature of the base negative electrode at 300° C. using a heater built in a holder for holding the base negative electrode. In this way, a negative electrode having the negative electrode active material layer in which lithium had been occluded in advance was obtained. As shown in Table 1, a plurality of the negative electrodes were fabricated by changing the vapor deposition amount of lithium in the range of in 7 to 28 μm.

In Table 1, the "vapor deposition amount of lithium" indicates the amount of lithium vapor-deposited on the negative electrode in advance. More specifically, it indicates a value converted into deposition thickness when lithium is vapor-deposited, under the same conditions, on a flat substrate that neither reacts with nor absorb lithium. The "capacity difference from reference value" shows the difference between the capacity of the negative electrode and a reference value when lithium was vapor-deposited in the thickness shown in each example. As disclosed herein, the "reference value" means the capacity of the negative electrode when lithium is vapor-deposited in a thickness of 7.5 μm, that is, when the irreversible capacity is compensated just enough. For example, Comparative Example 1 indicates that the irreversible capacity was compensated with an amount of lithium equivalent to the irreversible capacity almost just enough.

(f) Calculation of Initial Elongation Percentage of Negative Electrode

The lengths of the negative electrode in the longitudinal direction and the lateral direction (in the in-plane direction) when lithium had been vapor-deposited were measured. With the elongation percentage of the base negative electrode being taken as 0%, the elongation percentage in the longitudinal direction and that in the lateral direction were calculated separately. The average value of these percentages was calculated as the "initial elongation percentage" of the negative electrode. The elongation percentages in the longitudinal direction and the lateral direction were calculated by the formula (1) described above.

<Fabrication of Positive Electrode>

3 parts by weight of acetylene black was mixed with 100 parts by weight of a lithium cobalt oxide (LiCoO$_2$) having an average particle diameter of 5 μm. An NMP solution containing PVdF, which is 4 parts by weight when expressed in terms of the weight of PVdF, was added to the obtained mixture was added to the obtained mixture and mixed to obtain a pasty positive electrode material mixture. The positive electrode material mixture was applied, in a thickness of 85 μm, to one surface of a positive electrode current collector (with a thickness of 15 μm) made of aluminum foil and dried, and then the positive electrode current collector was roll-pressed. In this way, a positive electrode composed of, as the positive electrode active material, the lithium cobalt oxide with a stoichiometric composition was obtained. Hereinafter, this positive electrode will be called a "base positive electrode."

A nickel compound, a cobalt compound, an aluminum compound, and a lithium hydroxide were mixed at a specified ratio and sintered to obtain a lithium nickel oxide-based positive electrode active material (LiNi$_{0.8}$Co$_{0.15}$Al$_{0.05}$O$_2$). Using this lithium nickel oxide-based positive electrode active material, a positive electrode material mixture was prepared in the same manner as in the case of using the lithium cobalt oxide. The positive electrode material mixture was applied, in a thickness of 70 μm, to one surface of a positive electrode current collector and dried, and then the positive electrode current collector was roll-pressed. In this way, a positive electrode (base positive electrode) composed of the lithium nickel oxide-based positive electrode active material with a stoichiometric composition was obtained.

Subsequently, a lithium-deficient positive electrode was fabricated by charging the base positive electrode with a lithium metal counter electrode (that is, by releasing lithium). Specifically, the base positive electrode was cut out into dimensions of 15×15 mm, and an aluminum lead was bonded to an end thereof by ultrasonic welding. As the lithium metal counter electrode, there was prepared a lithium metal counter electrode obtained by fixing a nickel lead to an end of a lithium metal plate having the same dimensions as those of the base positive electrode. The base negative electrode with separators (each of which is a polyethylene microporous membrane with a thickness of 16 μm) disposed on the surfaces of the base negative electrode, respectively, was sandwiched between two lithium metal counter electrodes. An electrode group composed of the base positive electrode, the separators, and the lithium metal counter electrodes was accommodated in an outer case, and 1 cm$^3$ of electrolyte was poured into the outer case. The outer case was sealed by heat sealing. Thus, a half cell was obtained.

Next, the half cell was charged with a current of 1 mA/cm$^2$. As shown in Table 1, the amount of lithium deficiency x was adjusted in the range of 0 to 0.7 in accordance with the charging time. Comparative Examples 1, 2, 4, and 5 were not lithium-deficient. The "amount of lithium deficiency in positive electrode" in Table 1 indicates the composition of a lithium-deficient composite oxide denoted as $Li_{1-x}MO_2$, that is, the value of "x". The "amount of preliminary charging to positive electrode" has a one-to-one correspondence with the amount of lithium deficiency as described below.

A lithium cobalt oxide has a true density of 5 g/cm$^3$. In contrast, the lithium cobalt oxide in the positive electrode active material layer had a density of about 2.7 g/cm$^3$. Since the lithium cobalt oxide had a theoretical charge and discharge capacity of 274 mAh/g and the positive electrode active material layer had a thickness of about 85 μm, the theoretical charge and discharge capacity of the base positive electrode composed of the lithium cobalt oxide is about 6.3 mAh/cm$^2$. That is, a charge and discharge of about 0.63 mAh/cm$^2$ increases/decreases the amount of lithium deficiency x by 0.1. The "theoretical charge and discharge capacity" means the capacity in the case of allowing the amount of lithium deficiency x to vary in the range of 0 to 1.

A lithium nickel oxide-based positive electrode active material ($LiNi_{0.8}Co_{0.15}Al_{0.05}O_2$) has a true density of 4.8 g/cm$^3$. In contrast, the lithium nickel oxide-based positive electrode active material in the positive electrode active material layer had a density of about 3.2 g/cm$^3$. Since the lithium nickel oxide-based positive electrode active material had a theoretical charge and discharge capacity of 279 mAh/g and the positive electrode active material layer had a thickness of about 70 μm, the theoretical charge and discharge capacity of the base positive electrode composed of the lithium nickel oxide-based positive electrode active material is about 6.1 mAh/cm$^2$. That is, a charge and discharge of about 0.61 mAh/cm$^2$ increases/decreases the amount of lithium deficiency x by 0.1.

<Assembly>

A lithium secondary battery was fabricated from the negative electrode and the positive electrode. First, a nickel lead was bonded to an end of the negative electrode by spot welding. The lithium-deficient positive electrode was cut out into dimensions of 15×15 mm, and an aluminum lead was bonded to an end thereof by ultrasonic welding. The base negative electrode with separators (each of which is a polyethylene microporous membrane with a thickness of 16 μm) disposed on the surfaces of the base negative electrode, respectively, was sandwiched between two positive electrodes. An electrode group composed of the positive electrodes, the separators, and the negative electrode was accommodated in an outer case, and 1 cm$^3$ of electrolyte was poured into the outer case. The outer case was sealed by heat sealing. Thus, the lithium secondary battery was obtained. In order to calculate the elongation percentages of the negative electrode in the charge state and the discharge state, a plurality of the lithium secondary batteries were prepared using the negative electrodes and the positive electrodes fabricated under the same conditions.

<Measurement of Reversible Charge and Discharge Capacity>

The fabricated lithium secondary batteries were measured for reversible charge and discharge capacity. Specifically, each of the lithium secondary batteries was charged with a current of 1 mA/cm$^2$ until the voltage between the two electrodes became 4.2 V, and then the capacity (reversible charge and discharge capacity) was measured when the lithium secondary battery was discharged with a current of 1 mA/cm$^2$ until the voltage between the electrodes became 2 V. Table 1 shows the results thereof.

<Calculation of Elongation Percentages of Negative Electrode in the Charge State and the Discharge State>

The manufactured lithium secondary batteries were charged with a current of 1 mA/cm$^2$ until the voltage between the two electrodes became 4.2 V. The lithium secondary batteries in the charge state each were disassembled, and the elongation percentage of the negative electrode in the charge state was calculated. A visual observation was made to see whether lithium was precipitated on the surface of the negative electrode. The lithium secondary batteries in the charge state were discharged with a current of 1 mA/cm$^2$ until the voltage between the two electrodes became 2 V. The lithium secondary batteries each were disassembled in the discharge state, and the elongation percentage of the negative electrode in the discharge state was calculated. A visual observation was made to see whether lithium was precipitated on the surface of the positive electrode. The elongation percentages in the charge state and the discharge state were calculated by the formulae (2) and (3) described above.

Table 1 shows the calculation results of the elongation percentages and the observation results of the lithium precipitation. Example 1, Example 2, and Comparative Examples 1 to 4 show the results in the case of using the lithium cobalt oxide as the positive electrode active material. Example 3 and Comparative Example 5 show the results in the case of using the lithium nickel oxide-based positive electrode active material.

TABLE 1

| | Vapor deposition amount of lithium (μm) | Capacity difference from reference value (mAh/cm$^2$) | Amount of preliminary charging to positive electrode (mAh/cm$^2$) | Amount of lithium deficiency in positive electrode (x) | Initial elongation percentage (%) | Elongation percentage in charge state (%) | Elongation percentage in discharge state (%) | Amount of change in elongation percentage (%) | Reversible charge and discharge capacity (mAh/cm$^2$) | Lithium precipitation after charge and discharge |
|---|---|---|---|---|---|---|---|---|---|---|
| Example 1 | 17 | 1.9 | 1.8 | 0.3 | 0.4 | 1.3 | 0.1 | +0.9, −0.3 | 4.1 | Not observed |
| Example 2 | 22 | 2.9 | 3.0 | 0.5 | 0.8 | 1.2 | 0.1 | +0.4, −0.7 | 4.0 | Not observed |
| C. Example 1 | 7 | −0.1 | 0 | 0 | 0.2 | 1.4 | 0.1 | +1.2, −0.1 | 4.0 | Not observed |
| C. Example 2 | 17 | 1.9 | 0 | 0 | 0.4 | 1.3 | 0.3 | +0.9, −0.1 | 2.3 | Observed |
| C. Example 3 | 28 | 4.1 | 4.2 | 0.7 | 1.1 | 1.5 | 0.1 | +0.4, −1.0 | 3.1 | Not observed |
| C. Example 4 | 28 | 4.1 | 0 | 0 | 1.1 | 1.5 | 0.7 | +0.4, −0.4 | 0.2 | Observed |

TABLE 1-continued

|   | Vapor deposition amount of lithium (μm) | Capacity difference from reference value (mAh/cm$^2$) | Amount of preliminary charging to positive electrode (mAh/cm$^2$) | Amount of lithium deficiency in positive electrode (x) | Initial elongation percentage (%) | Elongation percentage in charge state (%) | Elongation percentage in discharge state (%) | Amount of change in elongation percentage (%) | Reversible charge and discharge capacity (mAh/cm$^2$) | Lithium precipitation after charge and discharge |
|---|---|---|---|---|---|---|---|---|---|---|
| Example 3 | 17 | 1.9 | 1.7 | 0.3 | 0.4 | 1.2 | 0.2 | +0.8, −0.2 | 3.9 | Not observed |
| C. Example 5 | 17 | 1.9 | 0 | 0 | 0.4 | 1.3 | 0.3 | +0.9, −0.1 | 2.2 | Observed |

Examples 1 to 3 each had almost the same reversible charge and discharge capacity as that of Comparative Example 1 compensated with an amount of lithium equivalent to the irreversible capacity. In contrast, Comparative Examples 2 to 5 each had a small reversible charge and discharge capacity.

In Examples 1 to 3, the elongation percentages in the charge state and the discharge state were less than ±1%, with the initial elongation percentage being taken as 0%. More specifically, it was possible to achieve a balance between the elongation percentage in the charge state and the elongation percentage in the discharge state by adjusting the vapor deposition amount of lithium and the amount of lithium deficiency x in the positive electrode.

The "amount of change in elongation percentage" in Table 1 shows the value obtained by subtracting the initial elongation percentage from the elongation percentage in the charge state, and the value obtained by subtracting the initial elongation percentage from the elongation percentage in the discharge state. In Example 1, the elongation percentage in the charge state (1.3%) increased from the initial elongation percentage (0.4%) by 0.9%. The elongation percentage in the discharge state (0.1%) decreased from the initial elongation percentage (0.4%) by 0.3%. That is, the dimensions of the negative electrode in the discharge state were smaller than those of the negative electrode when lithium had been vapor-deposited.

Likewise, in Example 2, the elongation percentage in the charge state was increased from the initial elongation percentage by 0.4%, and the elongation percentage in the discharge state was decreased from the initial elongation percentage by 0.7%. In Example 3, the elongation percentage in the charge state was increased from the initial elongation percentage by 0.8%, and the elongation percentage in the discharge state was decreased from the initial elongation percentage by 0.2%.

In contrast, in Comparative Example 1, the elongation percentage in the charge state was increased from the initial elongation percentage by 1.2%, and the elongation percentage in the discharge state was decreased from the initial elongation percentage by 0.1%. In Comparative Example 2, the elongation percentage in the charge state was increased from the initial elongation percentage by 0.9%, and the elongation percentage in the discharge state was decreased from the initial elongation percentage by 0.1%. In Comparative Example 3, the elongation percentage in the charge state was increased from the initial elongation percentage by 0.4%, and the elongation percentage in the discharge state was decreased from the initial elongation percentage by 1.0%. In Comparative Example 4, the elongation percentage in the charge state was increased from the initial elongation percentage by 0.4%, and the elongation percentage in the discharge state was decreased from the initial elongation percentage by 0.4%. In Comparative Example 5, the elongation percentage in the charge state was increased from the initial elongation percentage by 0.9%, and the elongation percentage in the discharge state was decreased from the initial elongation percentage by 0.1%.

As in Comparative Example 1, when the elongation percentages of the negative electrode during charge and discharge is too high (for example, the elongation percentage is different from the initial elongation percentage by more than ±1%), the deformation of the negative electrode during charge and discharge is more likely to occur. Also, there tend to occur problems such as an increase in the internal pressure of the battery and damages to the separator and the positive electrode. These problems tend to be notable in wound-type lithium secondary batteries in which the space for the electrode group to expand and contract is limited severely. In Comparative Example 3, the elongation percentages of the negative electrode during charge and discharge were in the allowable range, but the amount of lithium deficiency is as relatively large as 0.7. Since the positive electrode active material with a large amount of lithium deficiency is unstable, the battery capacity may be reduced relatively quickly through the charging and discharging cycle.

In Comparative Examples 2, 4, and 5, the elongation percentages of the negative electrode during charge and discharge were in the allowable range, but lithium was precipitated during charge and discharge. This is because the positive electrode was fabricated using only the positive electrode active material with a stoichiometric composition (the positive electrode active material that was not lithium-deficient).

As shown in Table 1, the initial elongation percentage (0.4%) of Example 1 was about 31% of the elongation percentage (1.3%) in the charge state. Likewise, the initial elongation percentage (0.8%) of Example 2 was about 67% of the elongation percentage (1.2%) in the charge state. The initial elongation percentage (0.4%) of Example 3 was about 33% of the elongation percentage (1.2%) in the charge state. In contrast, the initial elongation percentage (0.2%) of Comparative Example 1, in which no lithium was precipitated during charge and discharge, was about 14% of the elongation percentage (1.4%) in the charge state. Likewise, the initial elongation percentage (1.1%) of Comparative Example 3 was about 73% of the elongation percentage (1.5%) in the charge state. These results reveal that it is desirable to adjust the vapor deposition amount of lithium so that the initial elongation percentage falls in the range of 20% to 70% (more desirably in the range of 30% to 70%) of the elongation percentage in the charge state.

From the results shown in Table 1, the amount of lithium deficiency x in the lithium-deficient composite oxide ($Li_{1-x}MO_2$) preferably is in the range of 0.2 to 0.6, more preferably in the range of $0.3 \le x \le 0.5$.

It is theoretically possible to increase/decrease the amount of positive electrode active material while keeping the amount of preliminary charging to the positive electrode at a constant value. However, in the case where the amount of positive electrode active material is reduced, for example, the positive electrode is used in a region in which x is large. Thus, the lithium secondary battery tends to be deteriorated through the charging and discharging cycle. Conversely, in the case where the amount of positive electrode active material is increased, the positive electrode is used in a region in which x is small. Accordingly, the charging and discharging characteristics are maintained in a satisfactory manner, but the excess positive electrode active material is used, which is disadvantageous for the charge and discharge energy density of the lithium secondary battery.

The present example describes the case where M in $Li_{1-x}MO_2$ is cobalt and the case where M includes nickel, cobalt, or aluminum. However, the present invention is not limited to these, and almost the same results can be achieved in all the cases where M includes at least one transition metal selected from the group consisting of cobalt, nickel, and manganese. Furthermore, the same results can be achieved also in the case where, instead of silicon, germanium or tin is used as the negative electrode active material.

The invention claimed is:

1. A method for manufacturing a lithium secondary battery, the method comprising steps of:
    forming, on a negative electrode current collector, a negative electrode active material layer containing at least one element selected from the group consisting of silicon, germanium, and tin;
    preparing a negative electrode by forming a lithium metal layer on the negative electrode active material layer;
    preparing a positive electrode having a configuration in which a positive electrode active material layer containing a composite oxide represented by a general formula $Li_{1-x}MO_2$, where $0.2 \leq x \leq 0.6$, and M includes at least one transition metal selected from the group consisting of cobalt, nickel, and manganese, is formed on a positive electrode current collector; and
    assembling a lithium secondary battery from the negative electrode, the positive electrode, and a separator,
    wherein in the step of forming the lithium metal layer, the lithium metal layer is formed on the negative electrode active material layer so that the lithium metal layer contains an amount of lithium exceeding an amount of lithium capable of compensating an irreversible capacity of the negative electrode active material layer.

2. The method for manufacturing the lithium secondary battery according to claim 1, wherein the negative electrode active material layer contains silicon.

3. The method for manufacturing the lithium secondary battery according to claim 1, further comprising the step of forming a plurality of projections on a surface of a metal foil used as a material of the negative electrode current collector,
    wherein the negative electrode active material layer is formed on the negative electrode current collector by an oblique deposition technique in which a material to be vapor-deposited is incident obliquely on the negative electrode current collector having the projections.

4. The method for manufacturing the lithium secondary battery according to claim 1, wherein the lithium metal layer is formed by vapor-depositing lithium metal on the negative electrode active material layer.

5. The method for manufacturing the lithium secondary battery according to claim 4, wherein the lithium metal is vapor-deposited on the negative electrode active material layer while keeping the negative electrode active material layer at a temperature of at least 200° C. but lower than 400° C.

6. The method for manufacturing the lithium secondary battery according to claim 1, wherein when a length of the negative electrode current collector in a specified direction in a plane before the lithium metal layer is formed is denoted as $S_0$, a length of the negative electrode current collector in the specified direction when the lithium metal layer has been formed is denoted as $S_1$, a length of the negative electrode current collector in the specified direction when the assembled lithium secondary battery is in a charge state is denoted as $S_C$, and a length of the negative electrode current collector in the specified direction when the assembled lithium secondary battery is in a discharge state is denoted as $S_D$, and furthermore, an initial elongation percentage, an elongation percentage in the charge state, and an elongation percentage in the discharge state are defined by formulae (1) to (3) below, respectively,
    an amount of lithium in the lithium metal layer is adjusted so that a value obtained by subtracting the initial elongation percentage from the elongation percentage in the charge state is 1% or less and a value obtained by subtracting the initial elongation percentage from the elongation percentage in the discharge state is −1% or more, $$\text{(Initial elongation percentage)} = 100 \times (S_1 - S_0)/S_0 \quad (1),$$

$$\text{(Elongation percentage in the charge state)} = 100 \times (S_C - S_0)/S_0 \quad (2), \text{ and}$$

$$\text{(Elongation percentage in the discharge state)} = 100 \times (S_D - S_0)/S_0 \quad (3).$$

7. The method for manufacturing the lithium secondary battery according to claim 1, wherein a charge capacity and a discharge capacity of the negative electrode active material layer on which the lithium metal layer is to be formed are measured, and the irreversible capacity is calculated in advance based on a capacity obtained by subtracting the measured discharge capacity from the measured charge capacity.

* * * * *